US008449366B2

(12) United States Patent
Thomas

(10) Patent No.: US 8,449,366 B2

(45) Date of Patent: May 28, 2013

(54) WAGERING GAME SYSTEM HAVING BONUS GAME CONFIGURATIONS

(75) Inventor: Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 907 days.

(21) Appl. No.: 12/302,243

(22) PCT Filed: May 24, 2007

(86) PCT No.: PCT/US2007/012368

§ 371 (c)(1), (2), (4) Date: Nov. 24, 2008

(87) PCT Pub. No.: WO2007/139874

PCT Pub. Date: Jun. 12, 2007

(65) Prior Publication Data

US 2009/0143136 A1 Jun. 4, 2009

Related U.S. Application Data

(60) Provisional application No. 60/802,984, filed on May 24, 2006.

(51) Int. Cl.

*A63F 13/00* (2006.01)

*A63F 9/24* (2006.01)

(52) U.S. Cl.

USPC .................................. 463/16; 463/25; 463/43

(58) Field of Classification Search

USPC .................................... 463/16, 20, 25, 42, 43

See application file for complete search history.

(56) References Cited

U.S. PATENT DOCUMENTS

| | | | | |
|---|---|---|---|---|
| 5,083,271 | A | 1/1992 | Thacher et al. | 341/411 |
| 5,655,961 | A | 8/1997 | Acres et al. | 463/27 |
| 5,761,649 | A | 6/1998 | Hill | 705/27 |
| 5,851,149 | A | 12/1998 | Xidos et al. | 463/42 |
| RE37,885 | E | 10/2002 | Acres et al. | 463/42 |
| 6,645,077 | B2 | 11/2003 | Rowe | 463/42 |
| 6,656,048 | B2 | 12/2003 | Olsen | 463/25 |
| RE38,812 | E | 10/2005 | Acres et al. | 463/26 |
| 7,144,321 | B2 | 12/2006 | Mayeroff | 463/16 |
| 7,285,049 | B1 | 10/2007 | Luciano, Jr. et al. | 463/42 |
| 7,914,377 | B2 | 3/2011 | Benbrahim et al. | 463/25 |
| 2002/0090990 | A1 | 7/2002 | Joshi et al. | 463/20 |
| 2002/0142846 | A1* | 10/2002 | Paulsen | 463/43 |

(Continued)

FOREIGN PATENT DOCUMENTS

| | | |
|---|---|---|
| AU | 5251830 | 12/2005 |
| WO | WO 2005/120672 A2 | 12/2005 |
| WO | WO 2006/076185 A2 | 7/2006 |
| WO | WO 2008/030904 A2 | 3/2008 |

OTHER PUBLICATIONS

International Search Report mailed Aug. 13, 2008 which issued during prosecution of corresponding International Patent Application No. PCT/US2007/012368. (3 pages).

*Primary Examiner* — Damon Pierce

(74) *Attorney, Agent, or Firm* — Nixon Peabody LLP

(57) ABSTRACT

A method for selecting a bonus game from a plurality of bonus games. Each of the plurality of bonus games have associated bonus game instructions. The method includes determining a bonus game outcome having an expected value. A set of criteria necessary to present the bonus game outcome is determined. One of the plurality of bonus games is selected and the selected bonus game meets the set of criteria.

29 Claims, 15 Drawing Sheets

| | BONUS GAME NAME | SINGLE (212a) | FIXED (212b) | RANDOM (212c) | VARIABLE (212d) |
|---|---|---|---|---|---|
| 210a | FISHING CHALLENGE | | X | | |
| 210b | PARTY GAME | | | | X |
| 210c | BOWLING BONUS | | X | | X |
| 210d | TREASURE CHEST | | | X | |
| 210e | POP A BALLOON | X | | | |

U.S. PATENT DOCUMENTS

| | | | | |
|---|---|---|---|---|
| 2004/0048649 | A1* | 3/2004 | Peterson et al. | 463/20 |
| 2005/0054419 | A1* | 3/2005 | Souza et al. | 463/20 |
| 2006/0073887 | A1 | 4/2006 | Nguyen et al. | 463/27 |
| 2006/0073888 | A1 | 4/2006 | Nguyen et al. | 463/27 |
| 2006/0142079 | A1 | 6/2006 | Ikehara et al. | 463/27 |
| 2007/0015572 | A1* | 1/2007 | Baerlocher | 463/25 |
| 2007/0060314 | A1 | 3/2007 | Baerlocher et al. | 463/25 |
| 2007/0060321 | A1 | 3/2007 | Vasquez et al. | 463/27 |
| 2007/0191088 | A1 | 8/2007 | Breckner et al. | 463/20 |
| 2007/0218975 | A1 | 9/2007 | Iddings et al. | 463/25 |
| 2007/0225065 | A1 | 9/2007 | Wright et al. | 463/25 |
| 2007/0259709 | A1 | 11/2007 | Kelly et al. | 463/20 |
| 2007/0293293 | A1 | 12/2007 | Baerlocher et al. | 463/16 |
| 2007/0298857 | A1 | 12/2007 | Schlottmann et al. | 463/16 |
| 2007/0298874 | A1 | 12/2007 | Baerlocher et al. | 463/27 |
| 2007/0298875 | A1 | 12/2007 | Baerlocher et al. | 463/27 |
| 2008/0020830 | A1 | 1/2008 | Ikehara et al. | 463/27 |
| 2008/0020831 | A1 | 1/2008 | Ikehara et al. | 463/27 |
| 2008/0020832 | A1 | 1/2008 | Iddings et al. | 463/27 |
| 2008/0020833 | A1 | 1/2008 | Baerlocher et al. | 463/27 |
| 2008/0020834 | A1 | 1/2008 | Breckner et al. | 463/27 |
| 2008/0020846 | A1 | 1/2008 | Vasquez et al. | 463/42 |
| 2008/0045344 | A1 | 2/2008 | Schlottmann et al. | 463/42 |
| 2008/0064502 | A1 | 3/2008 | Schlottmann et al. | 463/42 |
| 2008/0070680 | A1 | 3/2008 | Baerlocher et al. | 463/27 |
| 2008/0070692 | A1 | 3/2008 | Schlottmann et al. | 463/42 |
| 2008/0070693 | A1 | 3/2008 | Schlottmann et al. | 463/42 |
| 2008/0070694 | A1 | 3/2008 | Schlottmann et al. | 463/42 |
| 2008/0070695 | A1 | 3/2008 | Baerlocher et al. | 463/42 |
| 2008/0076514 | A1 | 3/2008 | Baerlocher et al. | 463/20 |
| 2008/0076515 | A1 | 3/2008 | Baerlocher et al. | 463/20 |
| 2008/0076517 | A1 | 3/2008 | Baerlocher et al. | 463/20 |
| 2008/0076552 | A1 | 3/2008 | Baerlocher et al. | 463/31 |

* cited by examiner 212a 212b 212c 212d

| BONUS GAME NAME | SINGLE | FIXED | RANDOM | VARIABLE |
|---|---|---|---|---|
| FISHING CHALLENGE | | X | | |
| PARTY GAME | | | | X |
| BOWLING BONUS | | X | | X |
| TREASURE CHEST | | | X | |
| POP A BALLOON | X | | | |

210a 210b 210c 210d 210e

*Fig. 13a*

| | FISHING CHALLENGE VERSIONS | YES | NO |
|---|---|---|---|
| 213a | PICK 2 OUT OF 4 X 5 ARRAY | | X |
| 213b | PICK 5 OUT OF 4 X 5 ARRAY | X | |
| 213c | PICK 2 OUT OF 5 X 5 ARRAY | | X |
| 213d | PICK 5 OUT OF 5 X 5 ARRAY | | X |
| 213e | PICK 7 OUT OF 5 X 6 ARRAY | X | |

*Fig. 13b*

| | CATEGORIES | YES | NO |
|---|---|---|---|
| 214a | PLAYERS CLUB REQUIRED | | X |
| 214b | NON-THEME SPECIFIC | | X |
| 214c | SPORTS THEME SPECIFIC | X | X |
| 214d | REQUIRES GAME CHARACTER | | X |
| 214e | PROPERTY SPECIFIC | X | |

*Fig. 13c*

| | NEGOTIABLE RULE SETS | YES | NO |
|---|---|---|---|
| 216a | EXCLUSIVE CHARACTER | | X |
| 216b | PRIMARY CHARACTER | X | |
| 216c | CUSTOM BACKGROUND | | X |
| 216d | CUSTOM BUTTON | | X |
| 216e | CUSTOM GAME LOGO | X | |

*Fig. 13d*

300

| SELECTABLE ELEMENT | VALUE |
|---|---|
| 1 | 30 |
| 2 | 40 |
| 3 | 50 |
| 4 | 60 |
| 5 | 70 |

302

| SELECTABLE ELEMENT | VALUE |
|---|---|
| 1 | 15 |
| 2 | 30 |
| 3 | 50 |
| 4 | 70 |
| 5 | 85 |

304

| SELECTABLE ELEMENT | VALUE |
|---|---|
| 1 | 10 |
| 2 | 10 |
| 3 | 60 |
| 4 | 70 |
| 5 | 100 |

*Fig. 14a*

306

| SELECTABLE ELEMENT | VALUE |
|---|---|
| 1 | 15 |
| 2 | 20 |
| 3 | 25 |
| 4 | 30 |
| 5 | 35 |

308

| SELECTABLE ELEMENT | VALUE |
|---|---|
| 1 | 35 |
| 2 | 45 |
| 3 | 50 |
| 4 | 55 |
| 5 | 65 |

310

| SELECTABLE ELEMENT | VALUE |
|---|---|
| 1 | 25 |
| 2 | 50 |
| 3 | 75 |
| 4 | 100 |
| 5 | 125 |

*Fig. 14b*

WAGERING GAME SYSTEM HAVING BONUS GAME CONFIGURATIONS

RELATED APPLICATIONS

This application is a U.S. National Phase of International Application No. PCT/US2007/012368, filed May 24, 2007, and claims priority from that application. The international application claims priority in turn to U.S. Provisional Application No. 60/802,984 entitled "Wagering Game System Having Bonus Game Configurations" filed May 24, 2006. Both of the applications are being incorporated in their entirety by reference.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines and methods for playing wagering games, and more particularly, to a wagering game having a basic game and a plurality of possible bonus game configurations available from a network.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

However, in many current wagering games that include one or more bonus games, the bonus games are tied to the wagering game. In other words, a player playing the basic game will always encounter the same bonus games. There is not any variety in the types of bonus games offered, which can make the game less interesting for the player.

SUMMARY OF THE INVENTION

According to one embodiment of the present invention, a method for selecting a bonus game from a plurality of bonus games is provided. Each of the plurality of bonus games has associated bonus game instructions. The method includes determining a bonus game outcome having an expected value and determining a set of criteria necessary to present the bonus game outcome. One of the plurality of bonus games is selected such that the selected bonus game meeting the set of criteria.

According to another embodiment of the present invention, a network for playing wagering games is provided and includes a memory for storing a plurality of bonus games. A gaming machine is coupled to the memory. In response to a first predetermined event, the gaming machine receives a first one of a first group of bonus games. In response to a second predetermined event, a second one of a second group of bonus games is received by the gaming machine. The first group of bonus games has characteristics that are different from the second group of bonus games.

According to yet another embodiment of the present invention, a gaming system for playing a wagering game is provided and includes a memory storing a plurality of bonus-game instructions for presenting a bonus game outcome. A gaming machine is remotely located from, and coupled to, the memory. The gaming machine is for playing a wagering game and has a randomly selected outcome. A display for displaying the wagering game is included in the gaming machine. The gaming machine receives a selected one of the plurality of bonus-game instructions from the memory in response to a predetermined event. In response to the randomly selected outcome of the wagering game being a bonus-game-triggering outcome, the gaming machine executes the selected one of the plurality of bonus-game instructions and applies math data that is distinct from the bonus game instructions to present the bonus game on the display.

According to yet another embodiment of the present invention, a method for playing a wagering game is provided. The method includes triggering a bonus game outcome at a gaming machine. The bonus game outcome has an expected value. A bonus-game instruction set is selected from a plurality of bonus-game instruction sets that are stored remotely from the gaming machine. Math data is randomly selected to apply to the selected bonus-game instruction set. The random selection is based upon the expected value. The selected bonus-game instruction set is executed to present the bonus game with the randomly selected math data.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The foregoing and other advantages of the invention will become apparent upon reading the following detailed description and upon reference to the drawings.

FIG. 13*a* is a table illustrating a plurality of different bonus games and bonus game types according to one embodiment of the present invention.

FIG. 13*b* is a table illustrating various versions of a particular type of bonus game from FIG. 13*a*.

FIG. 13*c* is a table illustrating secondary criteria of a particular type of bonus game from FIG. 13*a*.

FIG. 13*d* is a table illustrating additional secondary criteria of a particular type of bonus game from FIG. 13*a*.

FIG. 14*a* is a plurality of math tables illustrating a plurality of credit values according to one embodiment of the present invention.

FIG. 14*b* is a plurality of math tables illustrating a plurality of credit values according to another embodiment of the present invention.

DESCRIPTION OF ILLUSTRATIVE EMBODIMENTS

Figure 1:
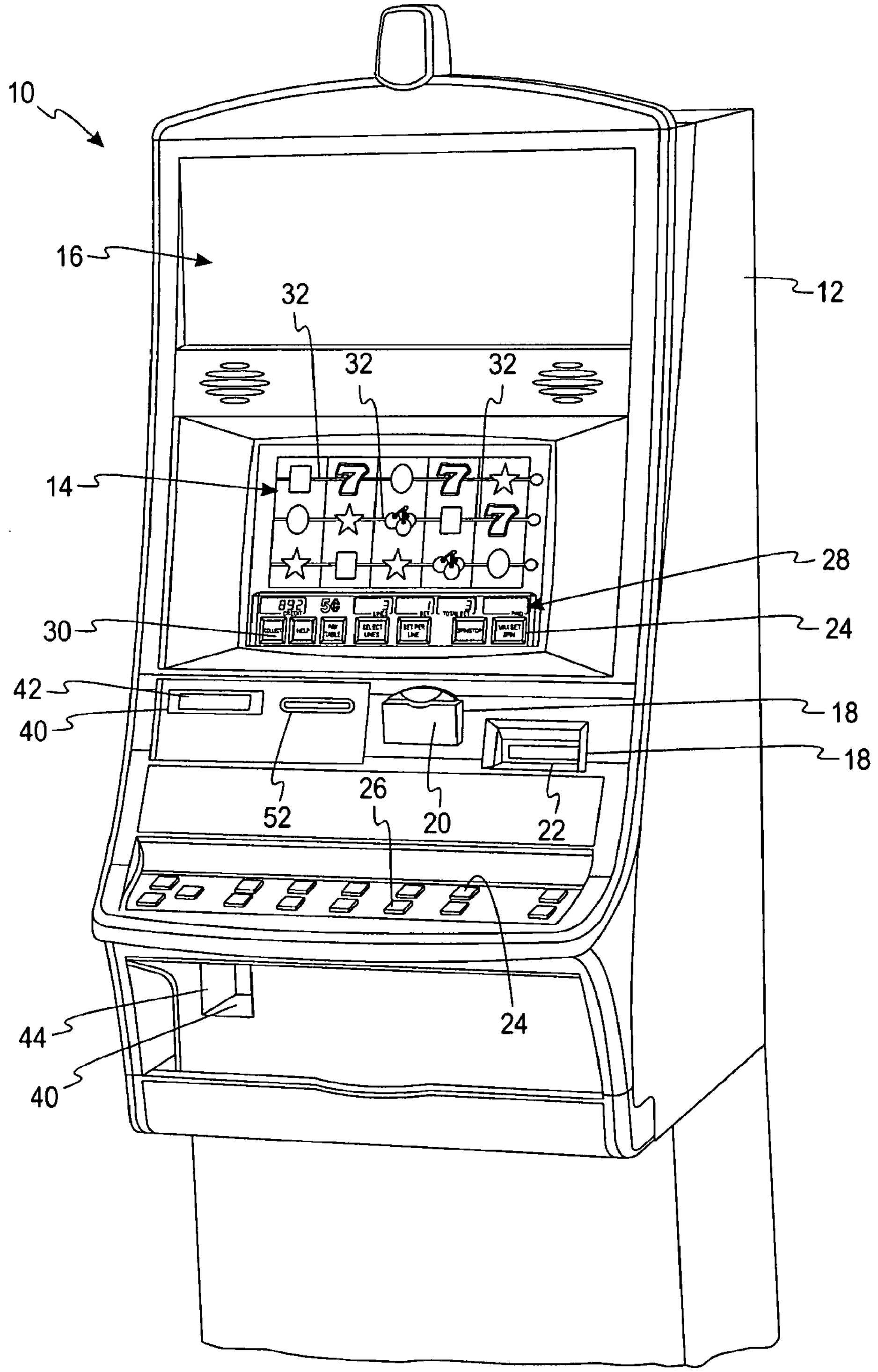
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12 or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof to allow players to make game-related selections. Alternatively, the primary display 14 of the gaming machine 10 may include a number of mechanical reels to display the outcome in visual association with at least one pay line 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one pay line 32 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
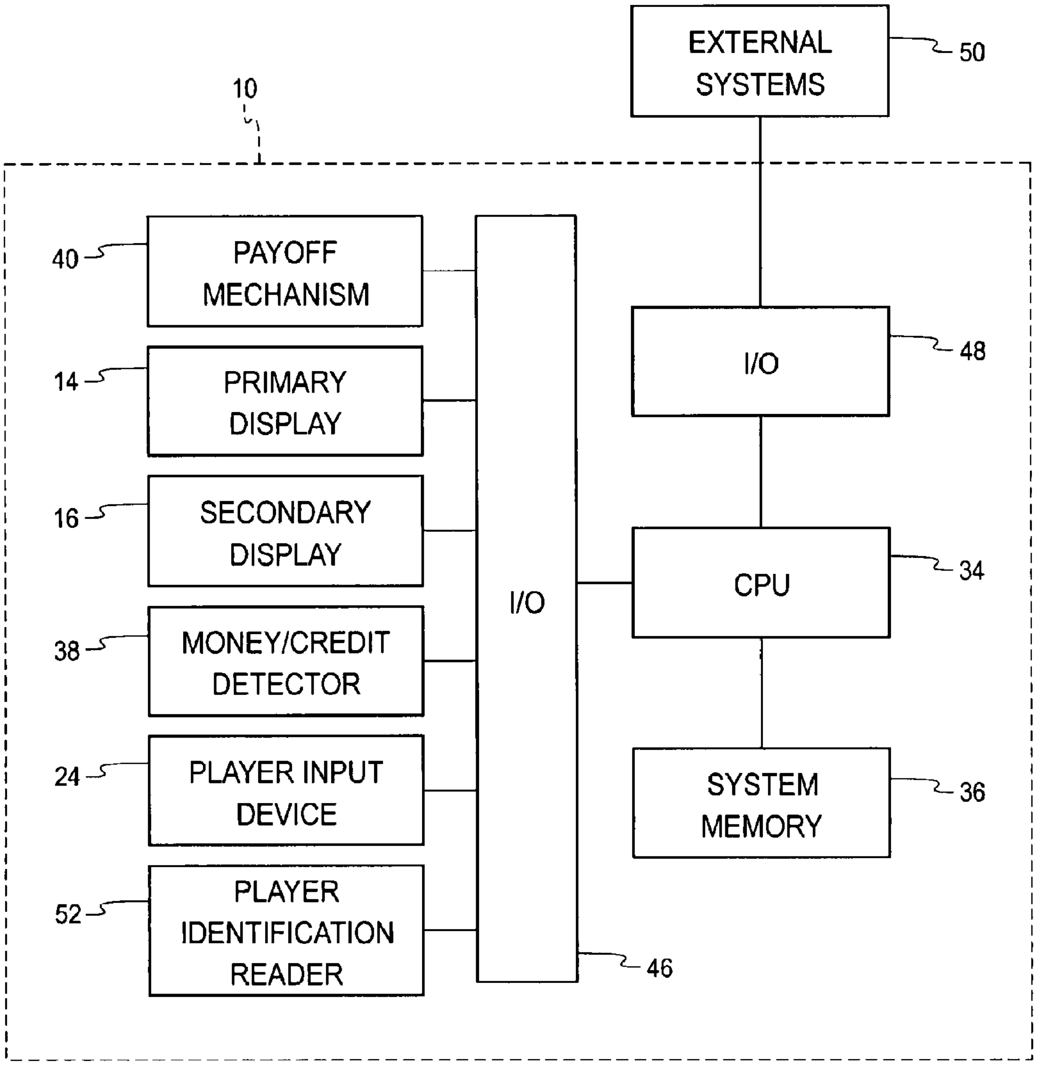
FIG. 2 is a block diagram of a control system suitable for operating the gaming machine.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Figure 3:
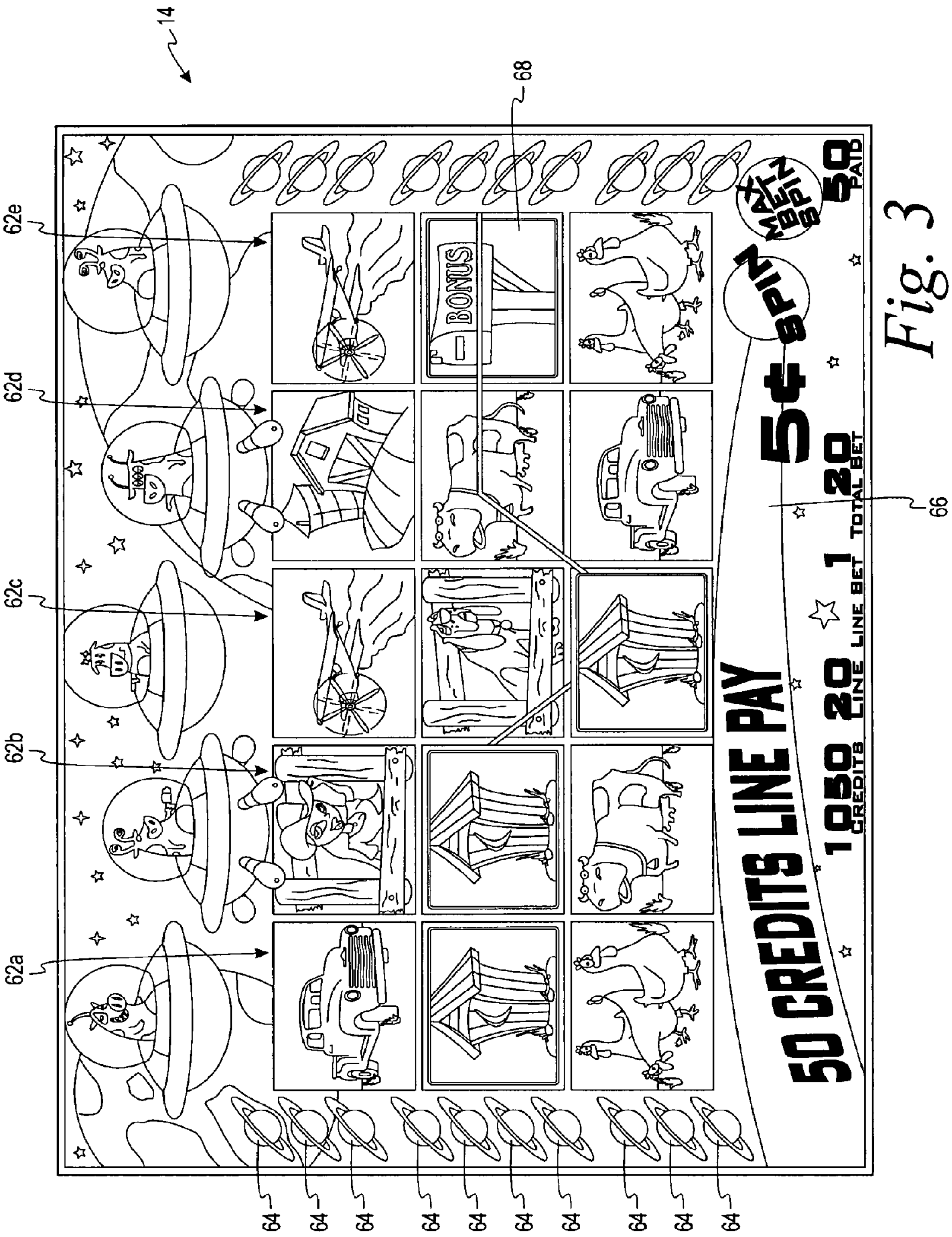
FIG. 3 is a display of a basic game according to one embodiment of the present invention.

Referring now to FIG. 3, the primary display 14 according to one embodiment of the present invention is illustrated. In this embodiment, the basic game is a slot machine game, with symbols on five different reels 62*a*, 62*b*, 62*c*, 62*d*, 62*e*. The reels 62*a-e* may be either traditional mechanical reels, electromechanical reels, or computer-generated images of reels, with each reel composed of a plurality of symbols. In this embodiment, there are multiple pay lines 64 across the various reels 62*a-e*. While multiple pay lines 64 are shown, a gaming machine 10 having a single pay line will also work with the present invention.

During the basic game, the player places a wager on any number of pay lines 64. In the illustrated embodiment, the wager may be between one and five credits per pay line 64. However, in other embodiments, other wager amounts may be made. Once the player has placed the wager, the reels 62*a-e* begin to spin. The result of the spin may be displayed on an outcome indicator 66, and winning pay lines 64 may be highlighted on the primary display 14. In the illustrated example, the pay line having three outhouses, a cow, and a bonus symbol 68 is a winning pay line (as highlighted in FIG. 3).

The player is awarded an initial basic game payout according to a basic game pay table as shown on the outcome indicator 66. The pay table for the basic game indicates the possible winning symbol combinations of symbols and the initial payout associated with each winning symbol combination. For line pays (i.e. winning symbol combinations that must appear on an active pay line), the payout is multiplied by the number of credits wagered on the winning pay line. For scatter pays (i.e. winning symbol combinations that must appear on the display but need not appear on an active pay line), the payout is multiplied by the total number of credits wagered.

In addition to having a winning symbol combination, the bonus symbol 68 also triggers the bonus game. In the illustrated embodiment, the bonus symbol 68 was located on the same pay line as the winning symbol combination. However, the bonus game is triggered in the event that the bonus symbol 68 appears on any selected pay line. Alternatively, the bonus game may be triggered if the bonus symbol 68 appears anywhere on the display 14. In other embodiments, the bonus game may only be triggered if the bonus symbol 68 appears in combination with other symbols (such as a winning symbol combination as shown in FIG. 3). In other embodiments, the bonus game may not be triggered by a symbol, but instead by a particular combination of symbols. In still other embodiments, the bonus game may be randomly triggered without a particular symbol or symbol combination being displayed (e.g., a mystery trigger).

Figure 4:
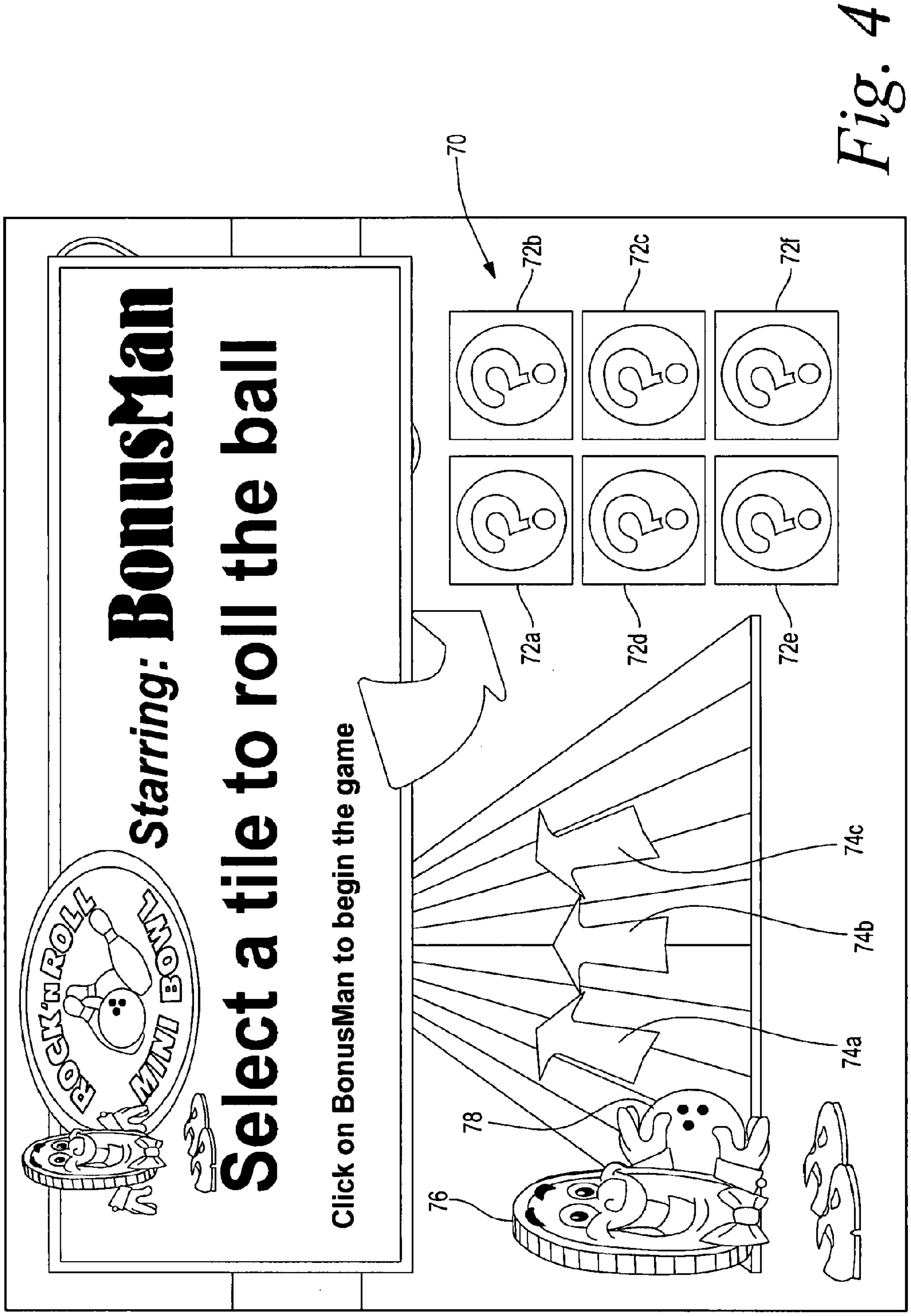
FIG. 4 is a display of a bonus game according to one embodiment of the present invention.
Figure 5:
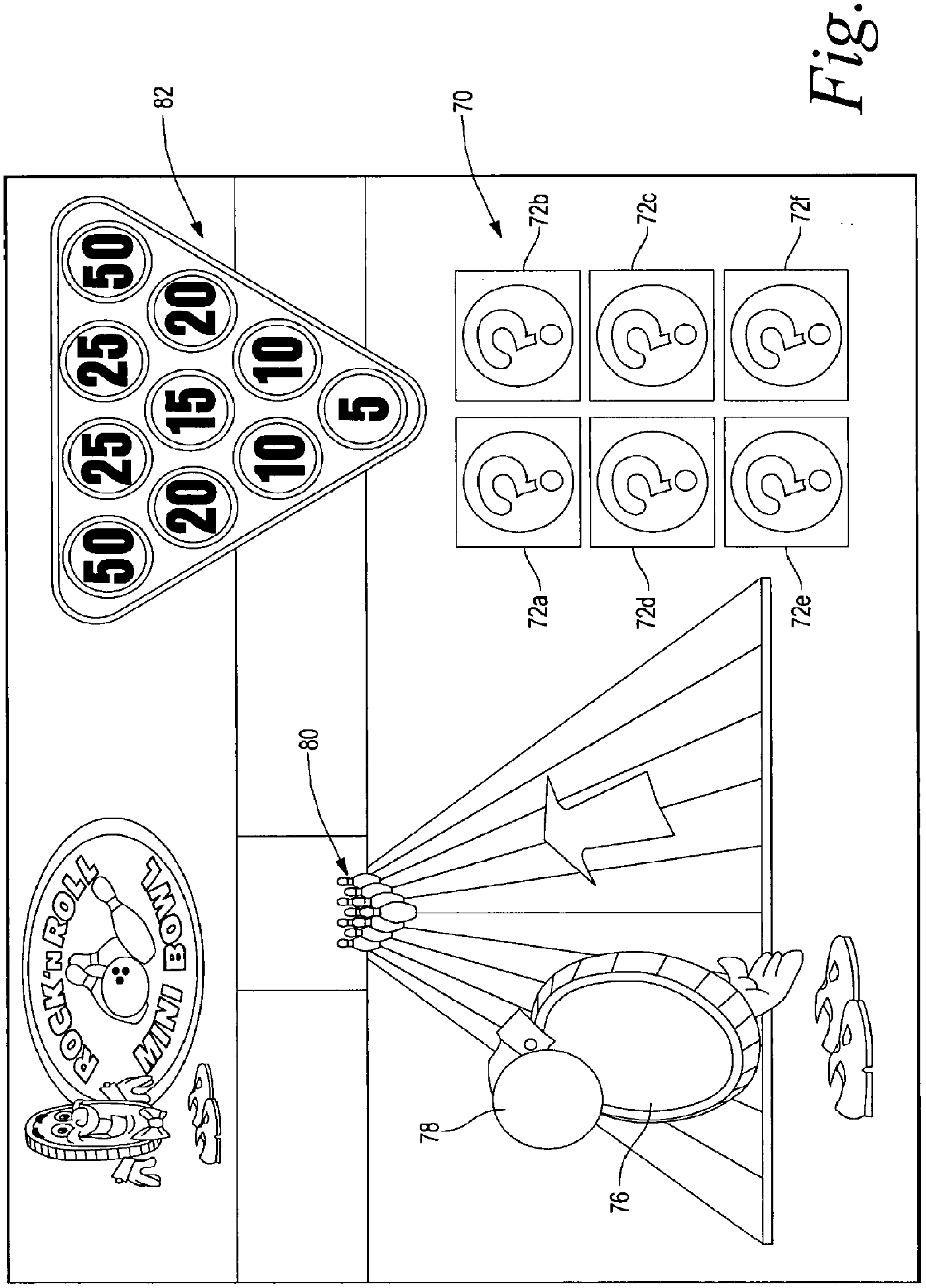
FIG. 5 is a subsequent display of the bonus game of FIG. 4.

Turning now to FIGS. 4-5, a display image 70 of one type of bonus game, a bowling game, is illustrated. The bonus game may be displayed on the primary display 14 and/or the secondary display 16. The display image 70 also includes six selectable elements 72, three selectable arrows 74, and a bonus character 76. In this embodiment, the bonus character 76 is holding a bowling ball 78. The display image 70 also includes a plurality of bowling pins 80 and a bonus-credit array 82. Each of the credit amounts in the bonus-credit array 82 corresponds to one of the bowling pins 80.

In the bonus game, the bonus character 76 moves between the three arrows 74. The three arrows 74 illustrate the position from which the bonus character 76 will roll the ball 78. In some embodiments, instead of the bonus character 76 automatically moving between the three arrows 74, the bonus character 76 may be moved by the player selecting one of the arrows 74. The arrow 74 may be selected by touching the arrow 74 on a touch screen, or it may be selected by activating a corresponding button. Alternatively, the player may be given a joystick or keypad with arrows, and may move the character between the three arrows 74 to pick the position.

While the bonus character 76 moves back and forth across the arrows 74*a*, 74*b*, and 74*c*, the player selects one of the six selectable elements 72. Each of the selectable elements 72 corresponds to a direction and a speed, which are initially masked from the player (see FIG. 6). The combination of the selected arrow 74 and the selected element 72 dictates an award in accordance with Table 1, in which values are randomly assigned for each bonus game.

TABLE 1

| | Arrow Left 74a | Arrow Central 74b | Arrow Right 74c |
|---|---|---|---|
| Selectable element 72a | 140 | 135 | 190 |
| Selectable element 72b | 155 | 120 | 180 |
| Selectable element 72c | 175 | 125 | 145 |
| Selectable element 72d | 190 | 165 | 135 |
| Selectable element 72e | 160 | 190 | 160 |
| Selectable element 72f | 150 | 145 | 130 |

Figure 6:
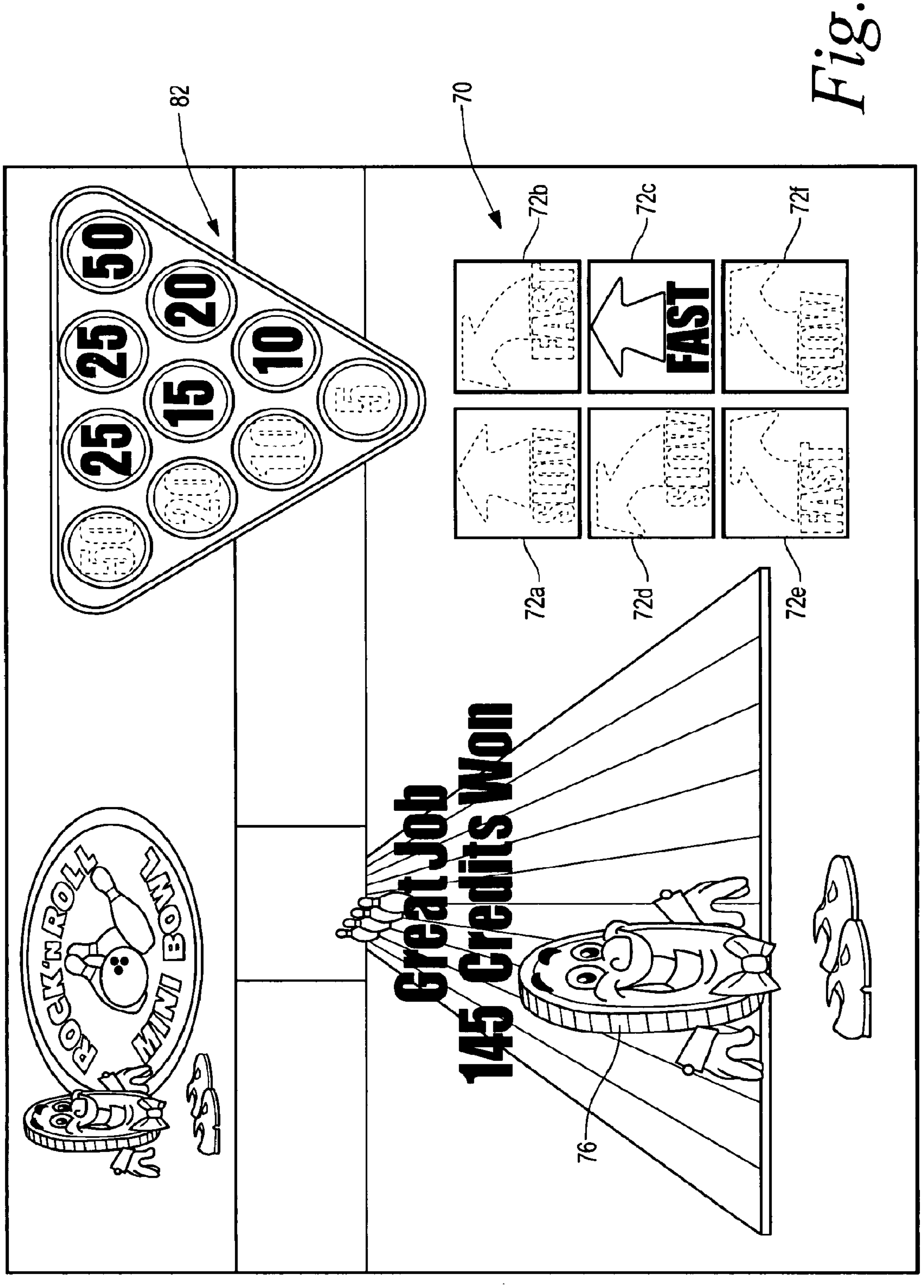
FIG. 6 is a subsequent display of the bonus game of FIG. 4.

As shown in FIG. 6, the player has selected the third selectable element 72*c*, which corresponds to the "fast straight ahead" arrow. The player selected the third selectable element 72*c* while the bonus character 76 was standing at the arrow right 74*c* position, resulting in a total prize of 145 credits as shown in the table above. The bonus credit array 82 illustrates which of the pins 80 that the ball 78 knocks down to achieve the awarded credit value. In this case, the player knocked down 6 pins for a total of 145 credits. The game may then continue with the selection process above, resulting in a second ball that may knock down one or more of the four remaining pins 80.

There are a variety of bonus games that may be played at the gaming machines 10. The bowling game described in FIGS. 4-6 is an example of a picking game in which the player is given a certain number of selections. Other picking games allow a player to pick until a game-ending selection, such as the one shown in FIG. 7. In the picking game of FIG. 7, the player is presented with a plurality of player-selectable elements, which are illustrated as presents 83*a*-83*r*. In the embodiment shown in FIG. 7, there are eighteen presents 83*a*-83*r*, but in other embodiments, there may be any number of presents. The player selects one of the presents 83*c*, and is awarded a prize corresponding to that present. The player continues to pick presents until a game ending symbol is revealed. The player is then awarded prizes associated with each of the selected presents.

Figure 7:
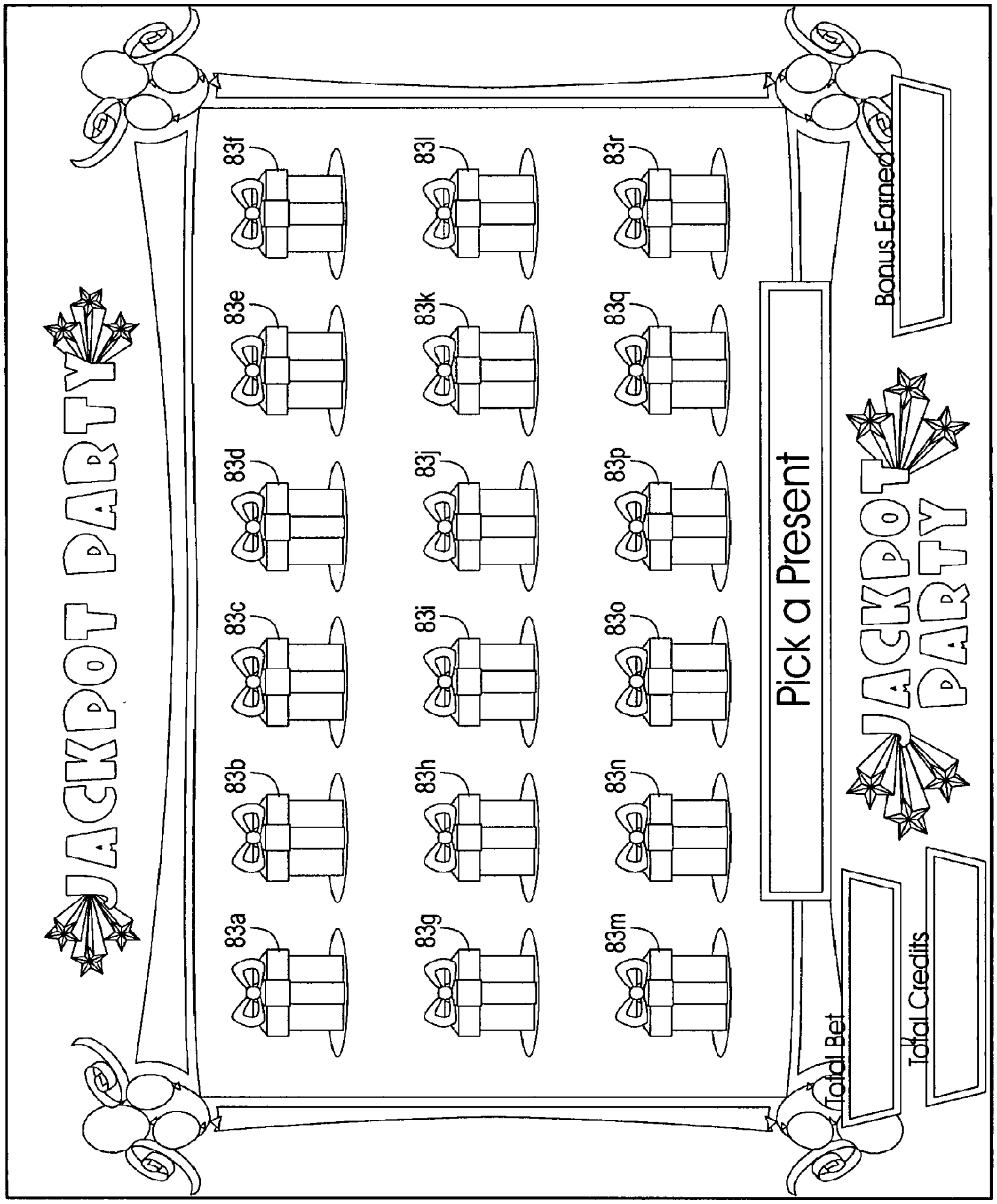
FIG. 7 is a display of a bonus game according to another embodiment of the present invention.

Alternatively, the party game of FIG. 7 can be formatted to be a game in which the player receives only one selection (in other embodiments, the fixed number may be a number other than one). The player then picks a present 83 and is awarded the credit value associated with that present. If the party game is formatted in this manner, then the same award table listed above for the bowling game of FIGS. 4-6 having eighteen credit values can be used to populate the awards masked by the eighteen presents in the party game of FIG. 7. As such, while the bowling bonus game and the party bonus game are different, the same math table can be used to dictate the bonus game outcome in either bonus game.

Figure 8:
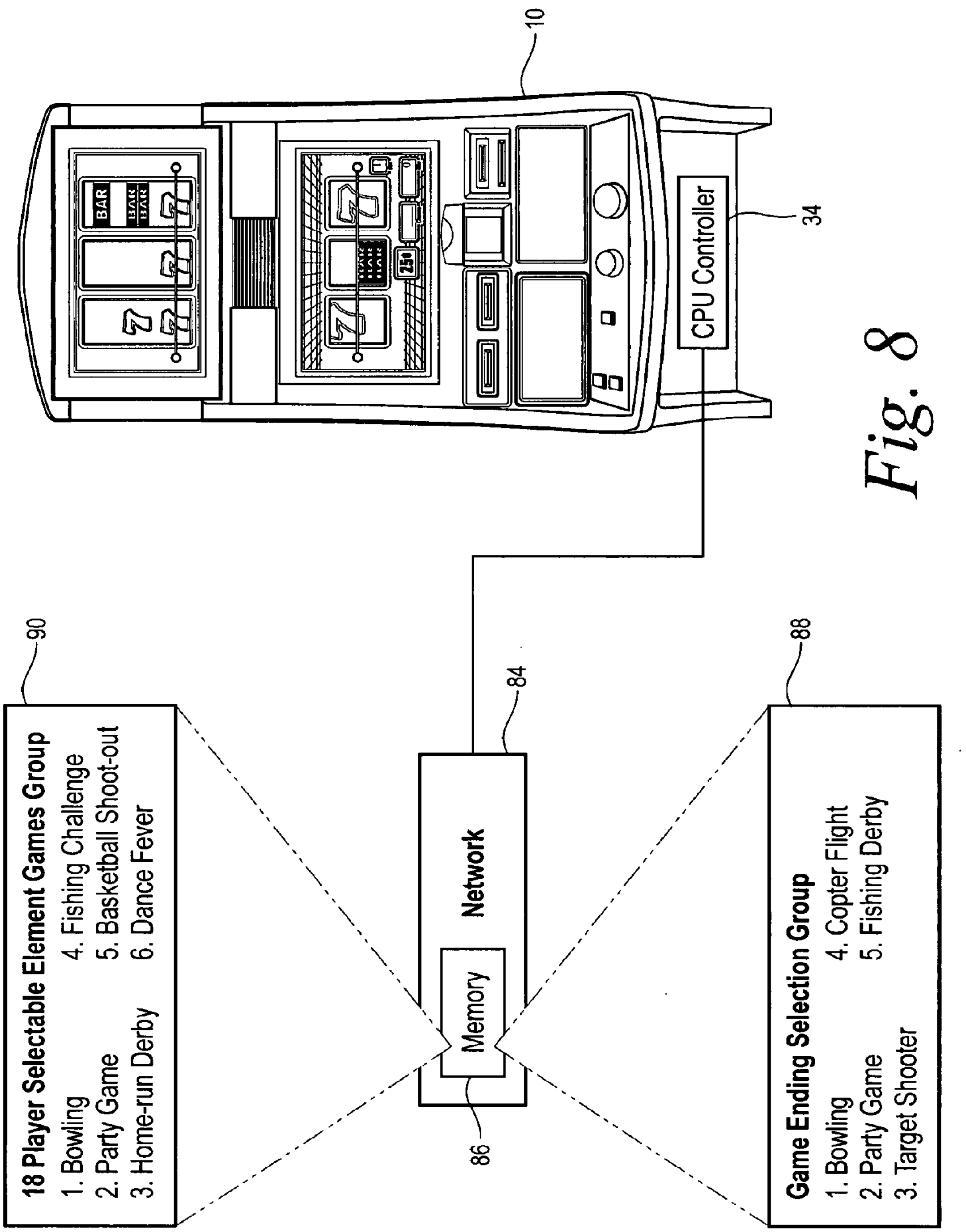
FIG. 8 is a block diagram of a gaming system according to another embodiment of the present invention.

FIG. 8 illustrates a block diagram of a network 84 for downloading bonus games, such as the bonus games of FIGS. 4-7. The network 84 may be a wide-area network encompassing a plurality of casinos with respective local-area networks. The components of each casino can communicate over wired and/or wireless connections. Furthermore, they can employ any suitable connection technology, such as Bluetooth, 802.11, Ethernet, public switched telephone networks, SONET, etc. The network 84 may link a variety of types of gaming machines. The gaming machines 10 can take any suitable form, such as floor standing models, handheld mobile units, bartop models, workstation-type console models, etc. In one embodiment, the network 84 can include other network devices, such as accounting servers, wide area progressive servers, and/or other devices suitable for use in connection with embodiments of the invention.

The network 84 includes, or is coupled to, an external memory 86 that stores bonus-game instruction sets, such as an instruction set for the bowling game of FIGS. 4-6 and the instruction set for the party game of FIG. 7. The memory 86 preferably stores instruction sets for groups of bonus games, such as a first group 88 and a second group 90, which are discussed in more detail below. The bonus game instruction set includes the basic instructions for operating the bonus game (i.e., the code or script for presenting an outcome in a bonus game, such as a bowling game with three selectable positions and six selectable elements for each position that dictates an outcome). The instruction sets are downloaded from the network 84 to the gaming machine 10 at certain times or based on the occurrence of certain events, as discussed in more detail below.

The bonus game instruction set is typically different from the audio content and video content associated with the bonus game. In particular, the bonus game instruction set is different from assets such as characters, backgrounds, symbol fonts, music, particular displays, etc. that are used within the bonus game. These assets may be stored with the instruction set at the memory 86 or can be stored locally at the gaming machine 10, as described in more detail below. The bonus character 76 of FIGS. 4-7 is an example of an asset for the bowling game. It should be noted that the instruction set and assets are different from the math that is used to dictate the outcome of the bonus game.

Regarding the math of the bonus game, typically the CPU 34 provides the math used for the bonus game. For example, in the bonus game, the number of credits associated with each pin 80 and the number of pins 80 that will be knocked down by the ball is controlled by the CPU 34. Typically, all of the mathematical decisions are made by the CPU 34 of the gaming machine 10. Thus, when the bonus game instruction set (and possibly the assets) is transmitted to the gaming machine 10 from the network 84, the gaming machine 10 populates the bonus game with the information and the math needed to randomly determine the outcome.

The arrangement of FIG. 8 in which the math is determined locally, but the instruction set (and possibly the assets) are downloaded has numerous advantages. Most existing gaming machines have a limited amount of memory, and, therefore, can only store a couple of different bonus games. By only storing the bonus game instruction sets on the network 84, memory space in the gaming machine 10 is saved. Further, it is difficult to store the complete bonus games, including the math, in the memory on a network because the random number generator (RNG) of each game needs to be approved by the appropriate regulatory body (e.g., the Nevada Gaming Commission). Thus, if the bonus games were to be stored in the memory on the network 84, every time a new bonus game is loaded onto the network 84, the bonus game would have to be approved, which takes time. However, in the present invention as described with respect to FIG. 7, new bonus games can be added without waiting for approval, because the math in the gaming machine 10 has already been approved. New games can be created and stored in the network 84 without delay. Changing the bonus game instructions without changing the math that goes into or populates the bonus game is analogous to changing the reel strips on a mechanical reel game without changing the odds of a particular outcome—the appearance of the game changes, but the player still has the same probability of winning.

As mentioned above, the CPU 34 of the gaming machine 10 may populate the bonus game with assets from the gaming machine 10. The assets on the gaming machine 10 are "resident" assets and may be either customizable assets or default assets. Default assets are typically used when an asset is needed for a bonus game, but there is not a customizable asset or a downloadable asset that can be used. Customizable assets are assets that are specific to the basic wagering game being played on the gaming machine. For example, if the gaming machine 10 has a MONOPOLY® wagering game theme, customizable assets may include characters such as Rich Uncle Moneybags™ or the common MONOPOLY® game tokens. Other customizable assets may include banners or other signs that include logos from the basic wagering game.

As shown in FIG. 8, in some embodiments, the memory 86 houses a plurality of different bonus game instruction sets. The memory 86 categorizes these bonus game instruction sets by types or themes (e.g., sports themes, board-game themes, etc). In the embodiment shown in FIG. 8, the bonus game instructions are characterized by the type of bonus game instruction set. A first group 88 of bonus game instruction sets has an end-game element and a second group 90 of bonus game instructions has eighteen possible player-selectable elements. Some bonus games may fall into multiple groups, while some bonus games may fall into only one group. The memory 86 may store many different groups of bonus games, and each group of bonus games may have any number of bonus games included therein. When the gaming machine 10 requests a bonus game, the gaming machine 10 may request a particular type (such as an eighteen player-selectable element bonus game) or even a specific bonus game within a group. A game server on the network 84 would then select one of the bonus game instructions from the second grouping 90 and the bonus game instruction set would be downloaded. If the gaming machine simply requests one bonus game of a certain type, then the selection of the bonus game within the group can be random or conducted pursuant to a rule set (e.g., selection based on a sequential order, selection of games based on time of day or day of the week, selection of certain games for certain types of winning outcomes, etc). The rule set may be determined by the gaming machine 10, the network 84, or a combination of both. Regardless of the method of selecting the bonus game, the bonus game instruction set for that selected bonus game is then downloaded from the network 84 to the machine 10.

The groups 88 and 90 of the bonus game instruction sets are changeable. Manufacturers and/or property owners (such as casinos) may add bonus game instruction sets to the network 84, for example, by downloading new instructions onto the network 84 from an external system or device. Bonus game instruction sets may also be removed in the same manner. Providing manufacturers and/or property owners with the ability to easily add and/or subtract bonus game instructions is advantageous because it offers them great flexibility and provides players with a great variety of games.

According to some embodiments, players may earn the ability to play various bonus games whose bonus game instruction sets are accessible by the gaming machine 10. For example, numerous bonus game instruction sets may be stored on the memory 86 communicatively coupled to the controller 34 of the gaming machine 10 via the network 84. The controller 34 operates and monitors one or more wagering game displayed on the gaming machine 10 and, if a predetermined outcome or threshold is achieved, one or more bonus game instruction sets can be unlocked. When bonus game instruction sets are unlocked, the bonus game instruction set may be downloaded to the gaming machine 10 such that the controller 34 can display the unlocked bonus game to the player. In these embodiments, over a period of time, the player builds an inventory of bonus games that may be provided to the player.

In some of the above embodiments, as the bonus games are played by a player the player's performance in the bonus game is tracked and graded—and the grade may be displayed to the player to indicate that they have played this particular bonus game and received this particular grade. A player may unlock additional bonus game instruction sets by achieving a particular grade within the unlocked bonus games or by playing the unlocked bonus games a predetermined number of times. The gaming machine 10 may provide a player with the ability to see all of the available bonus games and to indicate which bonus games are available to the player at this time.

Figure 9:
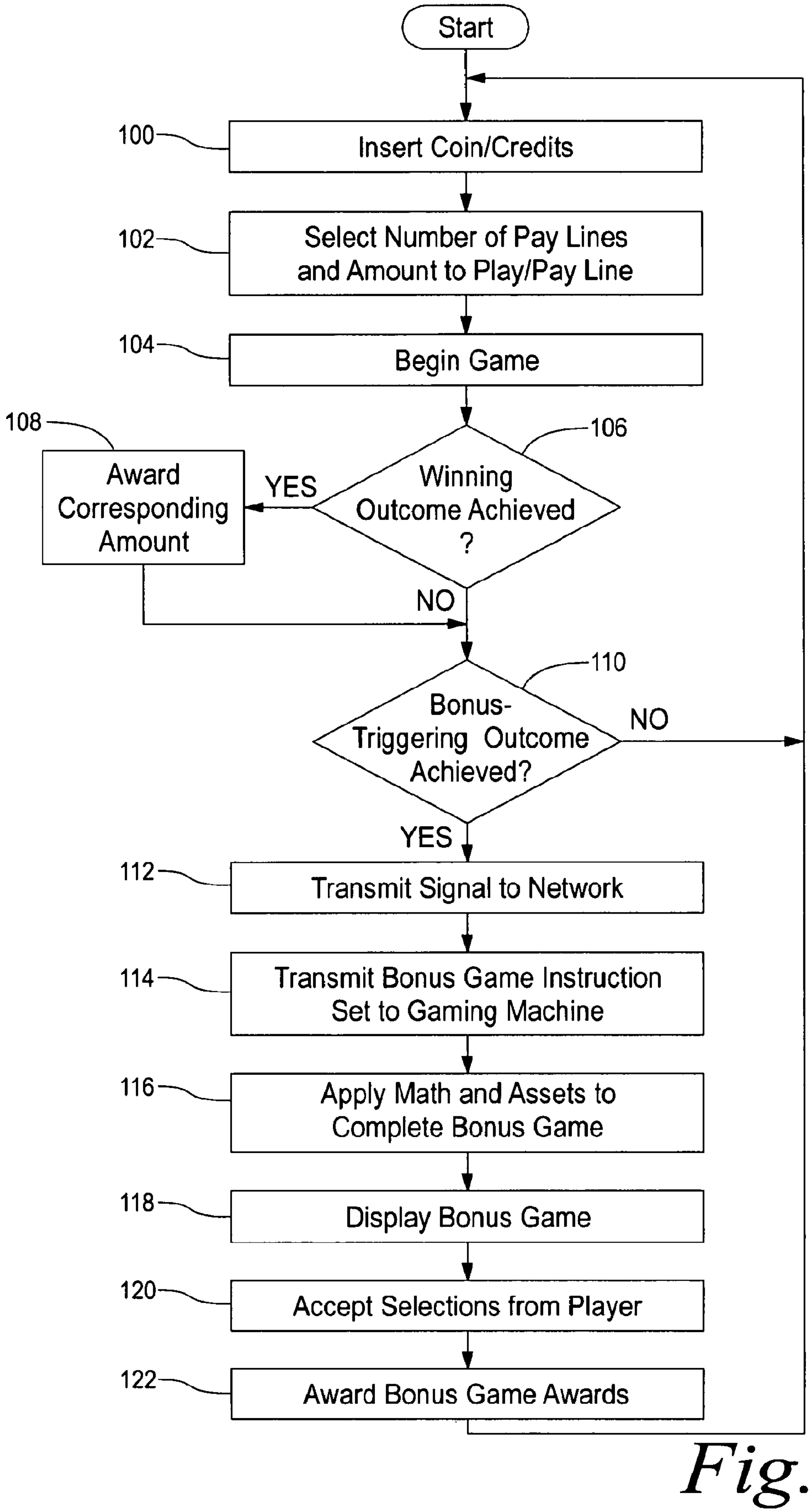
FIG. 9 is a flow chart illustrating a method of creating the bonus game according to one embodiment of the present invention.

FIG. 9 illustrates a flowchart for one method of implementing the bonus game configuration described above. At step 100, a player inserts coins or credits into the gaming machine 10. The player then selects the number of pay lines and the amount to play per pay line at step 102. Next, the player plays the wagering game at step 104. If the player achieves a winning outcome at step 106, the player is awarded an award that corresponds to the winning outcome at step 108. If the outcome is not a winning outcome, or, after the award has been awarded, the program proceeds to step 110 and it is determined whether the outcome is a bonus-triggering outcome.

If the outcome did not include a bonus-triggering outcome, then the game returns to step 100. If the outcome did include a bonus-triggering outcome, the gaming machine 10 transmits a signal to the network 84 requesting the bonus game instruction set (step 112). The network 84 then transmits the bonus game instruction set to the gaming machine 10 at step 114. The CPU 34 of the gaming machine 10 (or other controller or microprocessor in the gaming machine 10) then completes the bonus game by applying its math to the bonus game instruction set, creating the particular bonus credit amounts (step 116). The math would include, for example, the table listed above for the bowling bonus game. The CPU 34 may also apply assets to populate the game. At step 118, the completed bonus game is then displayed to the player. The player makes his or her selections at step 120, and is awarded the bonus-game awards at step 122.

The math that is added to the bonus game instruction set uses the expected value (EV), or theoretical average payout, of the achieved bonus game to determine the number of credits that should be associated with the different player-selectable elements. The credits are then populated onto the player-selectable elements of the bonus game. For example, if the bonus game that is triggered in the basic game is to have an EV of 155 credits, then the table used above to describe the bowling game is usable as the math table used to populate the bowling game. Had the player triggered a bonus game having an EV of 140, then a different math table would be used.

One benefit of the present invention is that the gaming machine 10 can supply more than just the math to the bonus game, depending on the manufacturer's desires. For example, the bonus game instruction sets may only be rudimentary instructions and may require that the gaming machine 10 supply the math and the video or audio content (i.e., resident assets). In the illustrated example from FIGS. 4-6, the character that performs the bowling may be supplied by the gaming machine 10. In other words, that particular bonus game requires a character to bowl, but the bonus games instruction set may pull the features (e.g., a particular character) from the basic wagering game on the gaming machine 10 to populate the bonus game. For example, if the basic game is a MONOPOLY®-themed game, the bowler may be Rich Uncle Moneybags™ or one of the common MONOPOLY® game tokens, such as the dog or the top hat. This allows the bonus game to have some continuity with the basic game. While the same bonus game instruction set can be applied to numerous different gaming machines 10, the actual bonus game at each gaming machine 10 would have a slightly different look and feel.

The network 84 may store a plurality of different bonus game instruction sets with the bonus game instruction set having different themes, as well as different numbers of player-selectable elements. For example, the network 84 could store various bonus game instruction sets with a bowling theme, but each bowling game would have a different number of player-selectable elements. The bowling game illustrated in FIGS. 4-6 included three ball positions and six selections for a total of eighteen different player-selectable elements. The network 84 could also store other bowling game instructions with twenty-four player-selectable elements, ten player-selectable elements, or any number of player-selectable elements. When the gaming machine 10 sends the request for a bonus game, the gaming machine 10 may also indicate the requested number of player-selectable elements.

In other words, after the player has triggered a bonus game in the basic game, the gaming machine 10 requests from the network 84 a bonus game instruction set that has eighteen player-selectable elements and the network 84 then downloads the bonus game instruction set corresponding to the bowling bonus game of FIGS. 4-6. Later, after the player has triggered a second bonus game while playing the basic game, the gaming machine 10 requests from the network 84 another bonus game instruction set that again has eighteen player-selectable elements and the network 84 then downloads the bonus game instruction set corresponding to the party bonus game of FIG. 7.

In other embodiments, the gaming machine 10 may request a certain type of bonus game instruction set. The network 84 may store a plurality of different bonus game instruction sets with different themes (bowling games, golf games, home-run derby games, picking games, etc). The gaming machine 10 may specify the type of bonus game instruction set that should be sent. In other embodiments, the gaming machine 10 may specify to the network 84 both the type of the bonus game instruction set and the number of selections the player should have (e.g., "transmit an eighteen-choice bowling game instruction").

In other embodiments, if a player has a player-tracking card, the player-tracking card or other device which stores gameplay information may be used to access stored preferences regarding bonus games. The player may be able to rate the various bonus games he or she has played. The gaming machine 10 may access this information by reading the player-tracking card, and then request a particular bonus game instruction set based on the player's preferences. Alternatively, the player-tracking card could be used to identify which of the bonus games that the player has played and may be used to present the player with bonus games that the player has not played before. Similarly, the player-tracking card could be utilized to determine which bonus games the player has previously unlocked or how close the player is to unlocking a particular bonus game.

In other embodiments, the results of the player's past bonus games may be stored and used to generate a larger, cumulative award. For example, if a player is playing the bowling bonus game of FIGS. 4-6, the player's results may be stored as "frames" in a standard bowling game. After playing the bowling bonus game ten times, the player's results from each frame may be added together. After the player meets certain criteria, the player may be granted greater awards. For example, a player who has a score of over 100 after ten frames may be awarded an extra ten credits or an extra bowling game.

In other words, combining player tracking with this unique bonus game configuration allows for players to accumulate assets (e.g., pins during a bowling session) and then be rewarded for achieving particular criteria over time or after a certain number gaming sessions. The player's information may be stored on the memory 86 of the network 84, or it may be stored in another memory.

In the alternative embodiments described above, some sort of negotiation is occurring between the gaming machine 10 and the network 84 that stores the bonus game instructions. The gaming machine 10 has a certain set of requirements, and the network communicates with the gaming machine 10 in order to select the bonus game instruction set that best meets these requirements. The negotiation process is described more below with respect to FIG. 13.

Figure 10:
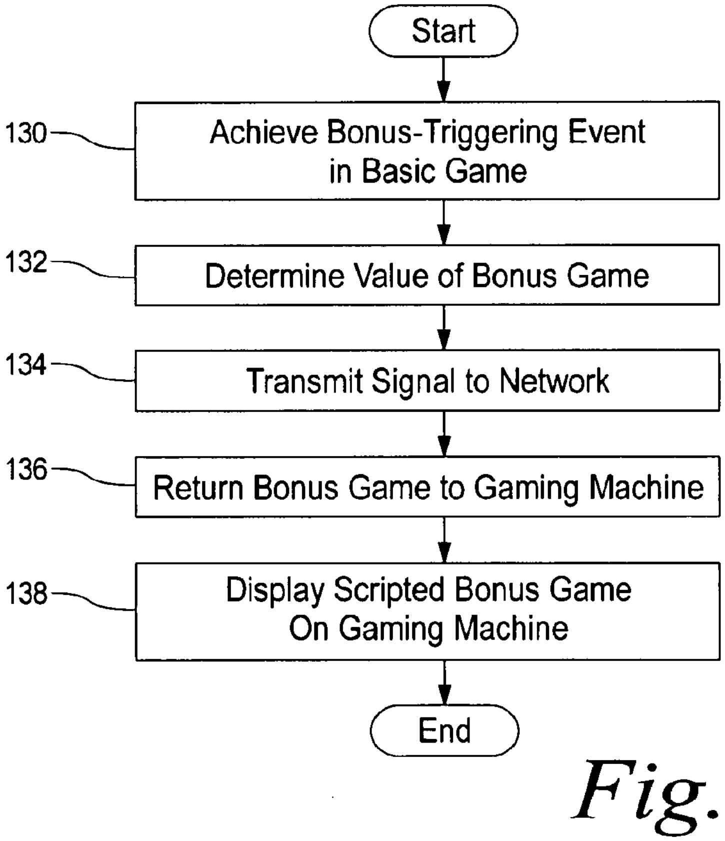
FIG. 10 is a flow chart illustrating a method of creating the bonus game according to another embodiment of the present invention.

Turning now to FIG. 10, a flow chart is set forth that describes another embodiment of the present invention in which a bonus game is downloaded with math content. In this embodiment, the CPU 34 of the gaming machine 10 does not populate the bonus game with its math. Instead, every bonus game stored in the network has a known and scripted outcome value. Depending on the value for the bonus game that has been achieved in the basic game, the gaming machine 10 sends a signal to the network 84 requesting a bonus game with that particular value.

As illustrated in FIG. 10, a player achieves a bonus-triggering event in a basic game at step 130. The gaming machine 10 determines the value of the bonus game (e.g., whether the player will win 30 credits, 10 credits, or 1 credit) at step 132. The gaming machine 10 then transmits a signal to the network 84 requesting a bonus game that has a payout equal to the value determined by the basic game (step 134). The network responds at step 136 with the appropriate bonus game. At step 138, the scripted bonus game is displayed on the gaming machine.

In these embodiments, the amount the player will win is predetermined by the gaming machine 10 at the end of the basic game. The player does not have a chance to win one of a variety of credits values through player input (e.g., player-selectable elements). Instead, the player will win a particular, predetermined credit amount. For example, although the bonus game may be the bowling game, no matter what the player selects, the bonus game outcome will be the same. Such games give the appearance of the player having control, although the bonus game outcome is already known before the player makes any selections. In this alternative embodiment, the memory 86 in the network 84 of FIG. 8 includes groups of bonus games corresponding to, for example, a 150-credit bonus game outcome, a 200-credit bonus game outcome, etc.

Figure 11:
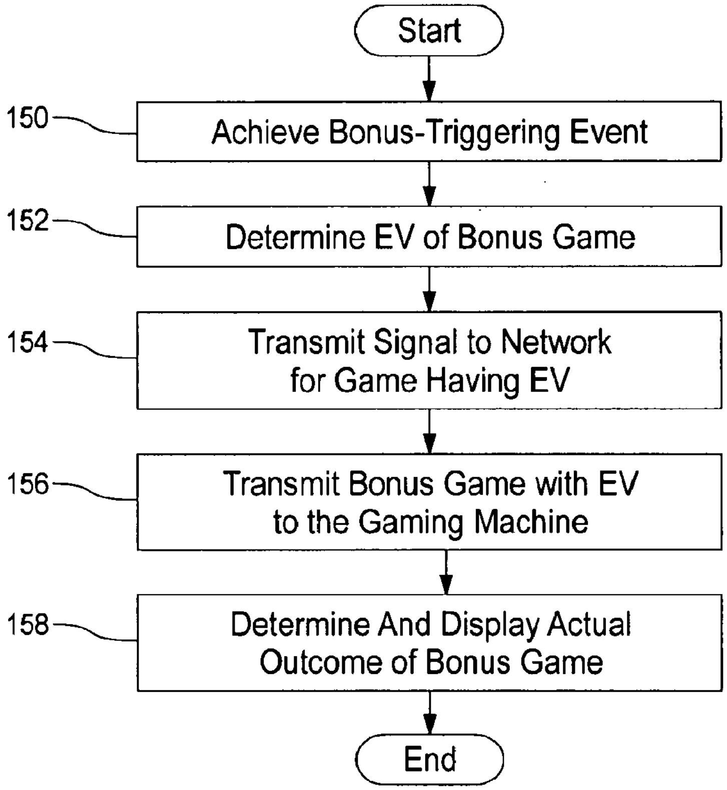
FIG. 11 is a flow chart illustrating a method of creating the bonus game according to yet another embodiment of the present invention.

FIG. 11 describes a flowchart of a further embodiment of the present invention in which a bonus game is downloaded with math content. In this embodiment, when the bonus-game triggering event is achieved at step 150, the gaming machine 10 also determines the EV for the bonus game at step 152. At step 154, the gaming machine 10 then transmits a signal to the network 84 requesting a bonus game having the determined EV.

The network 84 then downloads to the gaming machine 10 a bonus game having that particular EV (step 156). Next, at step 158, the actual outcome of the bonus game is determined and then displayed on the gaming machine 10. In this embodiment, the player's award amount is not exactly predetermined. Instead, the player may be required to make an input (e.g. player selectable elements) and the input dictates the bonus game outcome. For example, the bonus game may be a picking game having three different selections and an EV of fifty credits. One selection may be worth fifty credits, another selection may be worth thirty credits, and the third selection may be worth seventy credits (creating an EV of fifty credits if the player is provided with a single selection). In this alternative embodiment, the memory 86 in the network 84 of FIG. 8 includes groups of bonus games corresponding to, for example, a 150-credit EV bonus game, a 200-credit EV bonus game, etc.

Figure 12:
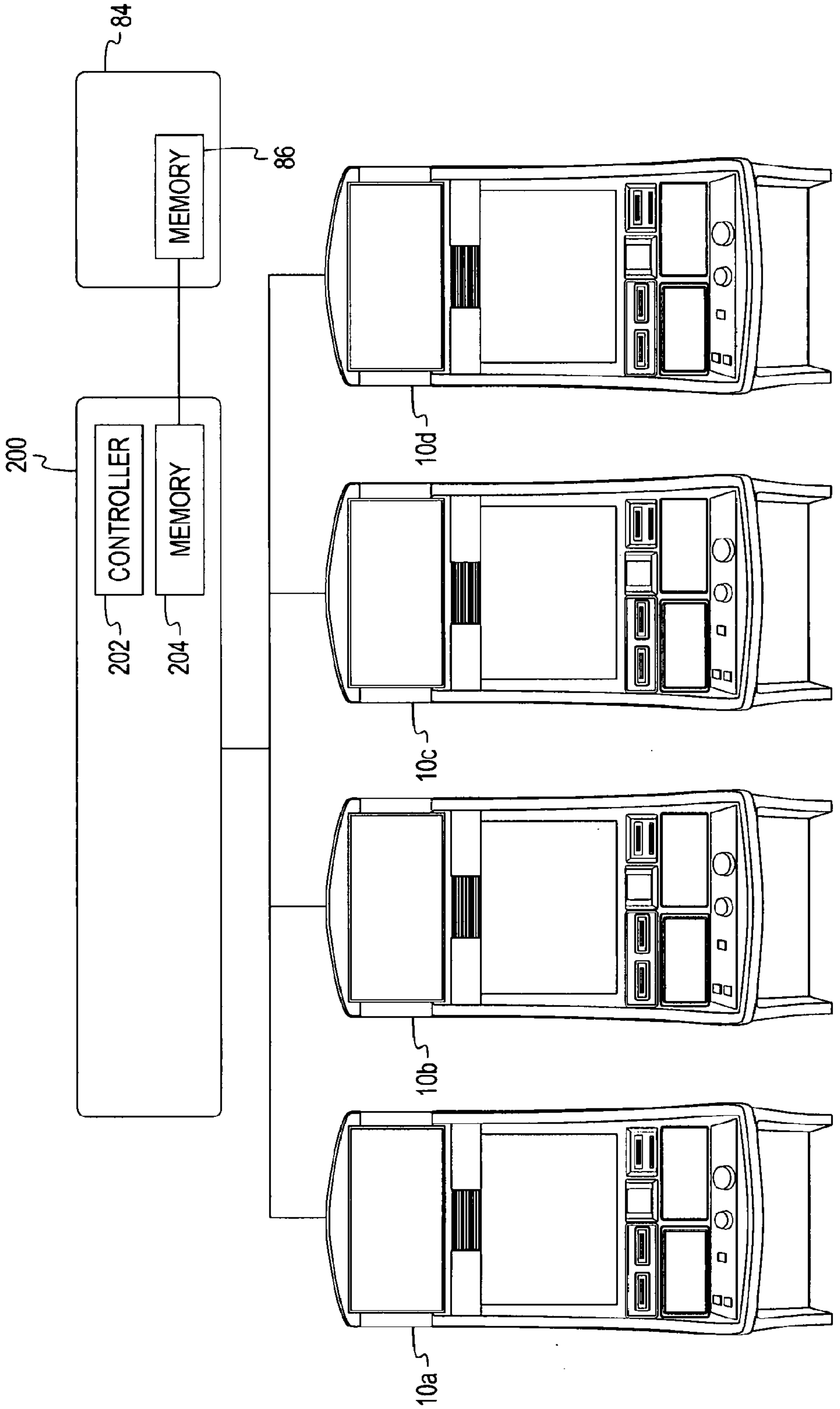
FIG. 12 is a block diagram of a gaming system according to another embodiment of the present invention.

Turning now to FIG. 12, another embodiment will be described that has a different architecture than FIG. 8. In this embodiment, a plurality of gaming machines 10*a-d* are linked under common signage 200, which is coupled to the network 84. The signage 200 includes a signage controller 202. The signage controller 202 may control only the graphics and display of the signage 200, or it may also control the play of the basic wagering games at the gaming machines 10.

The signage 200 also includes a memory 204. The signage memory 204 is adapted to store the bonus game instruction sets that are sent to the gaming machines 10. The signage memory 204 communicates with the network 84 and stores a certain number of the bonus game instructions. This allows the bonus game instructions to be downloaded quickly to the gaming machines 10*a*-10*d* because there are always bonus game instructions ready at the signage memory 204. In other words, there is an intermediate memory device (i.e., signage memory 204) that stores bonus game instruction sets for a certain group of gaming machines 10*a*-10*d*. The network may be linked to a plurality of these intermediate memory devices that provide bonus games to a small group (e.g., a bank) of gaming machines. The network 84 may download new bonus games to different intermediate memory devices at different times.

In the same manner as described above with respect to FIGS. 4-9, the signage memory 204 may merely store the bonus game instruction sets and the gaming machines 10*a*-10*d* use their own stored math to complete the bonus games. Resident assets at each gaming machine may help populate the bonus game. The signage memory 204 may store local "assets" affiliated with the signage 200 and use those local assets for populating the bonus games at the gaming machines 10*a*-10*d*.

Alternatively, in a manner consistent with FIGS. 10-11, the signage memory 204 may transfer the bonus game instructions to the gaming machines 10*a*-10*d* with math applied to the bonus game instructions. The signage controller 202 may be used to help apply the math, perhaps by a RNG resident within the signage controller 202.

The signage 200 may be used to display the upcoming bonus games. Players can then see which bonus games are to be played next, adding player excitement. Also, whenever a player at a linked gaming machine 10*a-d* achieves a bonus-triggering event, the signage 200 can indicate the beginning of the bonus game with sounds and video, also adding to the excitement.

FIGS. 13*a*-13*d* will be used to describe more of the details on the rules sets used to select a bonus game and to apply certain assets to the bonus game. In the bowling bonus game of FIGS. 4-6, in addition to the bonus game instruction set that controls the format and presentation of the bonus game, the bonus game may require assets such as background, bowling character, and a series of sounds to be a completed bonus game. The gaming machine 10 itself may provide these assets. For example, as stated above, the character 76 of FIGS. 4-6 may be linked to the basic wagering game. However, the completed bonus game may also acquire sounds and background images from the basic wagering game as well. In some embodiments, the bonus game requires a downloading of default assets in case the basic wagering game does not have any resident assets to provide.

In response to the bonus game being triggered, the CPU 34 communicates with the network 84 (see FIG. 8) to obtain bonus game instructions that meet predetermined criteria requested by the gaming machine. FIGS. 13*a-d* illustrate an example of how it is determined whether the bonus game instruction sets meet the predetermined criteria. In FIG. 13*a*, a table includes a plurality of different bonus games 210*a-e* in the first column and plurality of different bonus game types 212*a*-212*d* in the first row. In this embodiment, there are four different bonus-game types 212*a*-212*d*. The single selection type 212*a* is the type that allows a player a single selection from a plurality of player-selectable elements (e.g., one pick out of fifteen). The fixed selection type 212*b* is the type that allows a player a fixed number of selections (e.g., three selections out of fifteen player-selectable elements). The random selection type 212*c* allows the player a random number of selections out of an array. For example, a random number will be revealed during the game (e.g., three), and the player will then make three selections out of fifteen player-selectable elements in the array. The variable selection type 212*d* allows for selections from an array until a specific selection is made. For example, the player could keep picking elements until a game-ending selection ("pooper") is selected.

In FIG. 13*a*, the bowling bonus game 210*c* refers to the illustrated bowling game in FIGS. 4-6. In particular, the bowling game of FIGS. 4-6 required two player inputs—a selectable element 72*a-f* and an arrow selection 74*a-c*. As shown in Table 1 above, the selectable elements 72*a-f* and the arrow selections 74*a-c* combine to create a total of eighteen player-selectable elements. Therefore, the bowling bonus of FIGS. 4-6 is a fixed-selection type 212*b*.

Some bonus game instruction sets may be characterized as two or more different types. For example, as shown in FIG. 8, the bowling game is included in both the eighteen player-selectable elements game of the first group 88 and in the game-ending element group 90 (e.g., a bowling game where the player keeps bowling frames if they achieve "X" number of pins). Likewise, in FIG. 13*a*, the bowling bonus game 210*c* is categorized as fixed selection type 212*b* (perhaps two balls are bowled) and a variable selection type 212*d* (e.g., the player keeps bowling frames if they achieve "X" number of pins per frame).

FIG. 13*b* illustrates various bonus-game versions 213*a*-213*e* of the fixed bonus game type 212*b* for the Fishing Challenge bonus game 210*a* of FIG. 13*a*. The chart of FIG. 13*b* illustrates that the Fishing Challenge bonus game 210*a* includes a "pick 5 out of a 4×5 array" and "pick 7 out of a 5×6 array." In other words, when considering the various versions 213*a*-213*e* of arrays having player-selectable elements, the Fishing Challenge bonus game 210*a* is only operable with two versions 213*b* and 213*e* of the fixed bonus game type 212*b*.

FIG. 13*c* illustrates a plurality of secondary criteria of the Fishing Challenge bonus game. These secondary criteria are considered after the game type and game versions are considered. The secondary categories are further ways for the gaming machine 10 to determine whether a particular bonus game instruction match the gaming machine's needs. FIG. 13*c* illustrates five particular categories 214*a-e* that are considered.

The first category 214*a* is whether the player is required to be a member of a player's club. Certain bonus games may only be available to "preferred" members who meet particular criteria, such as being a member of a player's club. Membership in a player's club may be determined by a player's identification card, as described above. Alternatively, the player could input information (e.g., PIN, code number, etc) into the gaming machine 10 to identify himself or herself as a member of a player's club. In some embodiments, the available bonus games for play on a gaming machine are associated with the player's identification. Thus, the more bonus games that have been unlocked by a player, the greater the variety of games that can be selected and played.

Two other of the categories 214*b-c* relate to whether the bonus game instruction has a theme or requires a theme. Non-theme specific bonus game instructions are instructions that can be configured to match the theme of the basic game. One example would be a bonus game instruction set that utilizes several resident assets of the basic game on the gaming machine 10 to create the player-selectable elements. As such, regardless of the theme of the basic game, the bonus game will match that theme. The other category 214*c* is whether the bonus game instruction has a sports-theme. The bowling bonus game of FIGS. 4-6 and Fishing Challenge bonus game are considered sports-themed games.

A fourth secondary consideration 214*d* is whether the bonus game instruction requires a character. For example, the bonus game of FIGS. 4-6 includes the bonus character 76. An example of a bonus game without a character would be the picking game described in FIG. 7. Some gaming machines 10 may prefer a bonus game with a character while others may prefer a game without a character. The Fishing Challenge bonus game does not require a game character.

The final category 214*e* shown in FIG. 13*c* relates to whether the bonus game instruction set is specific to a particular location. Certain casinos may desire to have bonus game instruction set that are specific for their casino. Thus, such a game would be unique to a particular property and could be seen as a draw to the property. Category 214*e* allows the CPU 34 of a gaming machine 10 requesting a bonus game instruction to determine whether a particular bonus game instruction set is limited to a specific property. The Fishing Challenge bonus game is specific to a certain property.

FIG. 13*d* illustrates another set of secondary criteria that are to be considered. These secondary criteria are negotiable rule sets 216*a-e* that apply to a single bonus game instruction (such as the Fishing Challenge). The negotiable rule sets 216*a-e* indicate whether and how the bonus game will negotiate with the basic game regarding certain variables. The first variable 216*a* is whether the bonus game includes an exclusive character. A bonus game that includes an exclusive character will not allow the gaming machine 10 to substitute its own resident asset of the character. The bonus game instruction will require the use of its own downloadable asset (i.e., the character). Other bonus games may include a rule set 216*b* having a primary character, but the character is replaceable. For example, the bonus character 76 in the embodiment described in FIGS. 4-6 may be a primary character that is replaceable. If the basic game on the gaming machine 10 includes a resident asset of a character that it prefers to use, the bowling character 76 can be replaced.

Other negotiable rule sets include a custom background 216*c*, a custom button 216*d*, and a custom logo 216*e*. Some bonus game instructions may have downloadable assets that include backgrounds, buttons and logos (such as banners including the name of the bonus game). These downloadable assets may be negotiable, meaning that the bonus game may require that the button be included, but may not require that the background be included. This negotiation, in essence, occurs between the local gaming machine 10 which has certain requirements and the bonus game, which also may have certain requirements.

In practice, the CPU 34 of the gaming machine 10 has known requirements when communicating with the network 84 regarding the bonus game instructions. These requirements are set forth in FIGS. 13*a-d*. The requirements (which include type of bonus game, version of the bonus game, categories and rule sets) may be dictated by the type of gaming machine, the type of wagering game that is being played on the gaming machine, and/or the type of trigger that was achieved on the gaming machine. After the bonus game is triggered, the CPU 34 then negotiates with the network 84 regarding these requirements to determine which bonus game instruction will be downloaded. The network 84 will have to store enough bonus game instructions of varying requirements to meet all the requirements that could be sent by the CPU 34.

The following is an example of the communications between the network 84 and the CPU 34 when a bonus game is being selected and downloaded. Once the bonus game is triggered at the gaming machine 10, the gaming machine 10 sends a communication to the network 84 requesting a bonus game that is of the fixed selection type 212*b* (FIG. 13*a*). The specific request by the gaming machine 10 can be based on various parameters, such as, the type of bonus-triggering outcome, the time of day, the identity of the player, etc. When the communication is received by the network 84, the network 84 narrows the field by determining which of the bonus games 210*a*-210*e* is of a type that the gaming machine 10 requested. The network 84 then determines if the eligible bonus games, in this case the Fishing Challenge game, has the version 213*a-e* (FIG. 13*b*) that is needed. In this example, the CPU 34 requests the "pick 5 out of a 4×5 array" version 213*b* (FIG. 13*b*).

The communication from the CPU 34 to the network 84 may include secondary requirements, such as the theme of the bonus game and character types that are compatible with the requirements of the gaming machine 10. In this example, the gaming machine 10 requests a sports-themed game. Because the Fishing Challenge game as illustrated in FIG. 13*c* is a sports-themed game 214*c*, the Fishing Challenge bonus game meets the criteria 214.

The CPU 34 and the network 84 may also communicate regarding the various rule sets 216*a-e* shown in FIG. 13*d*. As stated above in reference to FIG. 8, the bonus game may be populated with certain assets. Assets located on the gaming machine 10 are resident assets, and may be customizable or default assets. Assets can also be downloaded with the bonus game instruction sets too. In determining which assets are to be used, the CPU 34 and the network 84 utilize the rule sets 216*a-e* of FIG. 13*d*.

The rule sets 216*a-e* rank the level of importance of each of the downloadable and customizable assets. Certain of the various rule sets are absolute (e.g., gaming machines having MONOPOLY®-themed games always use the customizable asset of Rich Uncle Moneybags™ as the character) while other rule sets may be negotiable. For example, a gaming machine 10 playing a traditional fruit-symbol based game may prefer to use a piece of fruit as the bonus character 76, but it will defer to an absolute rule from the bonus game instruction. After the negotiation takes place, the bonus game instructions and any downloadable assets agreed upon, are downloaded onto the gaming machine 10. The gaming machine 10 develops a complete bonus game by using the bonus game instruction set and the assets (local or downloaded) per the outcome of the negotiations. The gaming machine 10 also applies the math, such as the math tables of FIGS. 14*a* and 14*b*, to finalize the bonus game. A customized bonus game is then presented to the player.

In the event that a gaming machine 10 requests a bonus game with criteria that cannot be fulfilled by the network 84, then the network 84 may send a bonus game that best meets the requested criteria. Alternatively, the network 84 may send a communication to the gaming machine 10 for a supplemental request or instruct the gaming machine 10 to use a default bonus game resident on the gaming machine 10.

FIGS. 14*a* and 14*b* illustrate different types of math tables that can be stored locally in the gaming machine 10 or in the network 84 and downloaded onto the gaming machine 10 for application to a bonus game or bonus games. Both FIGS. 14*a* and 14*b* illustrate three math tables that are to be used in a bonus game having five player-selectable elements, with the player being given one choice. FIG. 14*a* illustrates three tables 300, 302, 304 and each table has an EV of 50 credits. As shown, the first table 300 includes five values corresponding to the five player-selectable elements of the bonus game. The five values have amounts of 30, 40, 50, 60, and 70 credits, making an EV of 50 credits. The second table 302 also has an EV of 50 credits, but has different values (15, 30, 50, 70 and 85 credits). The third table 304 includes five different values (10, 10, 60, 70, and 100 credits), but also has an EV of 50 credits.

As when the CPU 34 of the gaming machine 10 communicates with the network 84 to download a bonus game, the CPU 34 may also request a math table that will match the EV for the triggered bonus game, as determined by the CPU 34. When the CPU 34 requests a math table having an EV of 50 credits, the network 84 will select one of the three math tables 300, 302, 304 of FIG. 14*a*. In reality, the network 84 would likely have numerous tables like the math tables 300, 302, and 304 having an EV of 50 that could be selected and downloaded. The CPU 34 will then use the selected math table and the bonus game instruction (and perhaps downloaded or stored assets) to create a final bonus game to be played by the player.

Alternatively, the math tables 300, 302, and 304 are stored locally at the gaming machine 10 and the CPU 34 selects one of the math tables. The CPU 34 then uses the selected math table and the downloaded bonus game instructions (and perhaps downloaded or stored assets) to create a final bonus game to be played by the player.

In another embodiment illustrated in FIG. 14*b*, three math tables 306, 308, 310 are illustrated. In this embodiment, each math table 306, 308, 310 has a different EV, but the average EV of the three math tables 306, 308, 310 is 50 credits. As illustrated, the first math table 306 has an EV of 25 credits, with individual values of 15, 20, 25, 30, and 35 credits. The second math table 308 has an EV of 50 credits, with individual values of 35, 45, 50, 55, and 65 credits. The third math table, with individual values of 25, 50, 75, 100, and 125 credits has an EV of 75 credits. Although the three tables 306, 308, 310 have different EVs, the average EV of the three tables is 50 credits, such that the overall EV of the tables in FIG. 14*b* is the same as the overall EV of the tables in FIG. 14*a*.

In the embodiment of FIG. 14*b*, when the CPU 34 of the gaming machine 10 communicates with the network 84 to download a bonus game instruction, the CPU 34 also requests a math table that will match the EV determined by the CPU 34 (e.g., fifty credits). When the CPU 34 requests a math table having an EV of fifty credits, the network 84 will pull math tables whose collective average EV is fifty credits. However, the individual EV for each table does not need to be fifty credits. The network 84 then selects one of the three tables 306, 308, 310 to download into the gaming machine 10. In reality, the network 84 would likely have numerous tables like the math tables 306, 308, and 310 having an average EV of 50 that could be selected and downloaded. Similarly, if the math tables 306, 308, 310 are stored locally, then the CPU 34 performs this selection and applies the selected math table to the bonus game.

While the present invention has been described with reference to one or more particular embodiments, those skilled in the art will recognize that many changes may be made thereto without departing from the spirit and scope of the present invention. For example, in some embodiments, the player selects which bonus game to play. When the player achieves a bonus-game triggering outcome, the gaming machine 10 displays a library of different bonus games for the player to select. In other embodiments, only players identified as "elite club members" are offered the library of different games for selection. In yet other embodiments, the players meeting the criteria of "elite club members" may be allowed to select bonus games that other players are not allowed to select. In other words, by achieving some sort of special status, players may be granted access to play different types of games. Each of these embodiments and obvious variations thereof is contemplated as falling within the spirit and scope of the claimed invention, which is set forth in the following claims.

What is claimed is:

1. A method for selecting a bonus game from a plurality of available bonus games, each of the plurality of available bonus games having associated bonus game instructions, the method comprising:

presenting, by at least one of one or more processors, a base game at an electronic gaming machine, the base game including a bonus triggering outcome;

in response to the bonus triggering outcome occurring during the base game, determining, by at least one of the one or more processors, a bonus game expected value, the bonus game expected value being the average theoretical payout of the bonus game;

determining, by at least one of the one or more processors, a set of criteria relating to at least one of the available bonus games; and after determining the bonus game expected value and the set of criteria, selecting, by at least one of the one or more processors, one of the plurality of available bonus games, the selected bonus game meeting the set of criteria and having the bonus game expected value; and presenting, by at least one of the one or more processors, the selected bonus game at the gaming machine.

2. The method of claim 1, further comprising executing the associated bonus game instructions for the selected bonus game at a gaming machine at which the bonus game outcome was triggered.

3. The method of claim 1, further comprising displaying the bonus game outcome on a gaming machine.

4. The method of claim 3, wherein the gaming machine includes a memory, the memory including at least one resident asset, the resident asset being used in displaying the selected bonus game.

5. The method of claim 4, wherein the at least one resident asset is a default asset or a customized asset.

6. The method of claim 4, wherein the selected bonus game includes at least one downloadable asset that is downloaded to a gaming machine at which the bonus game outcome was triggered.

7. The method of claim 6, further comprising comparing the at least one resident asset to the at least one downloadable asset to determine which of the at least one resident asset and the at least one downloadable asset is to be used in the bonus game.

8. The method of claim 1, wherein the plurality of bonus games are categorized into groups of bonus games, the groups of bonus games being determined by the set of criteria, the method further comprising determining the group from which to select the bonus game.

9. The method of claim 8, wherein the set of criteria includes a number of player selections from a plurality of player-selectable elements.

10. The method of claim 1, wherein the selecting one of the plurality of bonus games includes a player selecting one of the plurality of bonus games.

11. The method of claim 1, wherein the selecting one of the plurality of bonus games is determined by a rule set resident on a network that includes a memory for storing the plurality of bonus games.

12. The method of claim 1, wherein the selecting one of the plurality of bonus games is determined by a rule set resident inside the gaming machine that triggers the bonus game outcome.

13. The method of claim 1, further including downloading the associated bonus game instruction of the selected bonus game from a memory to a gaming machine that triggers the bonus game outcome, wherein the memory is located external to the gaming machine.

14. The method of claim 13, further comprising applying math from the gaming machine that triggered the bonus game outcome to present the selected bonus game with an expected value.

15. The method of claim 1, wherein the plurality of bonus games are stored in a remote memory and further comprising adding at least one additional bonus game to the plurality of bonus games in the remote memory.

16. The method of claim 15, wherein the adding of at least one additional bonus game is performed by a manufacturer.

17. The method of claim 1, wherein the selected bonus game includes a bonus-game rule set and a gaming machine at which the bonus game outcome was triggered includes a gaming-machine rule set.

18. The method of claim 17, wherein the gaming-machine rule set requires at least one resident asset in the gaming machine to be used in the selected bonus game.

19. The method of claim 17, wherein the bonus-game rule set requires at least one downloadable asset is to be used in the selected bonus game.

20. The method of claim 17, further comprising deselecting the selected bonus game in response to the gaming-machine rule set not being compatible with the bonus-game rule set.

21. The method of claim 1, wherein a gaming machine that triggers the bonus game applies its math to present the selected bonus game with an expected value.

22. A system for playing wagering games comprising:

a memory for storing a plurality of bonus games; and a gaming machine coupled to the memory, wherein, in response to a first predetermined event, the gaming machine receiving a first one of a first group of bonus games, and in response to a second predetermined event, the gaming machine receiving a second one of a second group of bonus games, wherein the first group of bonus games have characteristics that are different from the second group of bonus games, wherein the first predetermined event includes a determination of a first bonus game expected value associated with the first group of bonus games and a first set of criteria relating to the first group of bonus games, the first bonus game expected value being the average theoretical payout of any of the first group of bonus games, and wherein the second predetermined event includes a determination of a second bonus game expected value associated with the second group of bonus games and a second set of criteria relating to the second group of bonus games, the second bonus game expected value being the average theoretical payout of any of the second group of bonus games.

23. The system of claim 22, wherein the gaming machine includes a memory, the memory including at least one resident asset, the resident asset being usable in displaying the selected bonus game.

24. The system of claim 23, wherein the first one of the first group of bonus games has at least one downloadable asset associated with it.

25. The system of claim 24, wherein the at least one resident asset replaces the downloadable asset based upon a set of rules.

26. A gaming system for playing a wagering game comprising:

a memory storing a plurality of bonus-game instructions for presenting a bonus game outcome, each of the bonus-game instructions having a bonus-game expected value; and a gaming machine remotely located from, and coupled to, the memory, the gaming machine for playing a wagering game having a randomly selected outcome, the gaming machine including a display for displaying the wagering game, the gaming machine receiving a selected one of the plurality of bonus-game instructions from the memory in response to a predetermined event, and wherein in response to the randomly selected outcome of the wagering game being a bonus-game-triggering outcome, the gaming machine executing the selected one of the plurality of bonus-game instructions, selecting a set of math data from a plurality of sets of math data, wherein the selected set of math data has an expected value matching the bonus-game expected value, and applying the selected set of math data to present the bonus game on the display, wherein the selected set of math data is distinct from the bonus-game instructions.

27. A method for playing a wagering game comprising:

accepting a wager via a wager input device;

triggering a bonus game outcome at a gaming machine, the bonus game outcome having an expected value;

selecting a bonus-game instruction set from a plurality of bonus-game instruction sets that are stored remotely from the gaming machine;

randomly selecting, by at least one of one or more processors, one set of math data from a plurality of sets of math data, each of the plurality of sets of math data having the expected value of the bonus game outcome and having payout values associated with respective outcomes to apply to the selected bonus-game instruction set; and executing, by at least one of the one or more processors, the selected bonus-game instruction set to present the bonus game with the randomly selected set of math data.

28. The method of claim 1, wherein the criteria includes at least one of game themes, game format, and past player performance.

29. The method of claim 1, further including transmitting a request to a network requesting a bonus game having the bonus game expected value, and downloading the selected bonus game to the gaming machine.

* * * * *

UNITED STATES PATENT AND TRADEMARK OFFICE

CERTIFICATE OF CORRECTION

PATENT NO. : 8,449,366 B2
APPLICATION NO. : 12/302243
DATED : May 28, 2013
INVENTOR(S) : Alfred Thomas It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1024 days.

Signed and Sealed this
Eighth Day of September, 2015

Michelle K. Lee
*Director of the United States Patent and Trademark Office*